United States Patent Office 3,308,114
Patented Mar. 7, 1967

3,308,114
UNSYMMETRICAL CHROMIUM CONTAINING
AZO DYESTUFFS
Alexander Blackhall, Manchester, England, assignor to Imperial Chemical Industries Limited, London, S.W. 1, England, a corporation of Great Britain
No Drawing. Filed May 14, 1963, Ser. No. 280,424
Claims priority, application Great Britain, Nov. 11, 1960, 38,780/60
8 Claims. (Cl. 260—145)

This application is a continuation-in-part of our application Serial No. 149,874, filed November 3, 1961, and now abandoned.

This invention relates to new azo dyestuffs and more particularly it relates to new chromium-containing azo dyestuffs which are valuable for colouring textile materials, especially nitrogen-containing textile materials.

According to the invention there are provided the chromium-containing azo dyestuffs which, in the form of the free acids, are represented by the formula

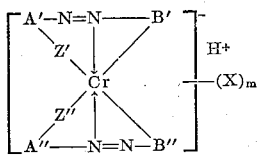

wherein A' and A" each independently represent a radical selected from the class consisting of benzene and naphthalene radicals;

Z' and Z" which are attached to A' and A" respectively in ortho positions to the azo groups are independently selected from the class consisting of —O— and —COO—;

B' and B" each independently represent the radical of a coupling component selected from the class consisting of acetoacetanilide, phenol, naphthol, naphthylamine, 2:4-dihydroxyquinoline, 1-phenyl-5-pyrazolone and 1-naphthyl-5-pyrazolone coupling components which couple in adjacent position to a metallisable group selected from the class consisting of hydroxy, amino and enolisable keto groups present in said coupling components;

and the benzene and naphthalene rings present in A', A", B' and B" are together substituted by a single sulphonic acid group and any further substituents on said rings are selected from the class consisting of chlorine, bromine, nitro, lower alkyl, lower alkoxy, lower alkyl sulphonyl, sulphamyl, sulphonmorpholide, N-lower alkyl sulphamyl, N-hydroxy lower alkyl sulphamyl, N-phenyl-sulphamyl, N-phenyl-N-lower alkly sulphamyl, acetyl, acteylamino, propionylamino, benzoylamino, benzene sulphonylamine, toluene sulphonylamino and carbo lower alkoxyamino;

m represents a positive integer not exceeding 2; and X represents a group selected from the class consisting of acryloylamino, chloroacetylamino, β-chloropropionyl-amino, γ-chloro-β-hydroxypropoxy, γ-chloro-β-hydroxypropylsulphonyl, γ-hydroxy-1:2-propenylsulphonyl, —SO₂CH₂CH₂OCOR and —SO₂CH₂CH₂OSO₂R wherein R is selected from the class consisting of lower alkyl, phenyl, tolyl, chlorophenyl and nitrophenyl.

Each of the groups represented by X is attached directly to a carbon atom of a benzene or naphthalene ring present in A', A", B' or B". It is preferred that the chromium-containing azo dyestuffs contain only one of the groups represented by X, and this group is preferably the acryloylamino group.

Throughout this specification the terms "lower alkyl" and "lower alkoxy" are used to denote alkyl and alkoxy radicals respectively of low molecular weight, in particular alkyl and alkoxy radicals containing from 1 to 4 carbon atoms.

As examples of the lower alkyl and lower alkoxy substituents which may be present as substituents in A', A", B' or B" there may be mentioned the methyl and methoxy radicals respectively. As examples of the lower alkyl sulphonyl groups which may be present in A', A", B' and B" there may be mentioned methylsulphonyl, ethylsulphonyl and propylsulphonyl groups. As examples of the said substituted sulphamyl groups which may be present in A', A", B' or B" there may be mentioned N-methylsulphamyl, N-ethylsulphamyl, N-methyl-N-ethylsulphamyl, N:N-dimethylsulphamyl, N:N-diethylsulphamyl, N-(β-hydroxyethyl)sulphamyl, N:N-di-(β-hydroxyethyl)sulphamyl, N-methyl-N-(β-hydroxyethyl)sulphamyl and N-phenyl-N-methylsulphamyl groups. As examples of the carbo lower alkoxyamino groups which may be present in A', A", B' or B" there may be mentioned carbomethoxy-amino, carboethoxyamino and carbo-isopropoxyamino groups.

The 1-phenyl-5-pyrazolone or 1-naphthyl-5-pyrazolone radicals represented by B' or B" preferably contain, attached to the 3-position of the pyrazolone ring, a methyl, —COO lower alkyl or a —CONHR group wherein R has the meaning stated.

As examples of the lower alkyl radicals represented by R there may be mentioned methyl, ethyl, propyl and butyl radicals.

The chromium-containing azo dyestuffs of the invention can be obtained by reacting together an azo compound of the formula:

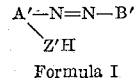

Formula I and a 1:1-chromium complex of an azo compound of the formula:

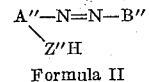

Formula II or a 1:1-chromium complex of an azo compound of Formula I and an azo compound of Formula II wherein A', A", B', B", Z' and Z" have the meanings stated, and the two azo compounds together contain one sulphonic acid group and one or two of the groups represented by X.

The chromium-containing azo dyestuffs of the invention can be obtained by heating the above reactants together in water or in a mixture of water and a water-miscible organic liquid such as ethanol, ethylene glycol or β-ethoxyethanol, adding sodium chloride and filtering off the dyestuff which is precipitated.

In carrying out the above reaction it is preferred to use 1 molecular proportion of the azo compound and 1 molecular proportion of the 1:1-chromium complex. However in some cases advantageous results are obtained if slightly more than 1 molecular proportion of the 1:1-chromium complex is used.

When the sulphonic acid group is present in the metal-free azo compound, it is frequently advantageous to dissolve the 1:1-chromium complex in a water-miscible organic liquid, heat the solution, and to add a hot solution of the metal free azo compound in water, or in a mixture of water and a water-miscible organic liquid, to the hot solution of the 1:1-chromium complex.

Where the group represented by X contains a hydrolysable halogen atom or acyloxy group, it is preferable to maintain the reaction mixture at a pH of 7 to 7.5 throughout the reaction period, but this precaution is not necessary in the cases where the group represented by X does not contain a hydrolysable halogen atom or acyl group.

The azo compounds of Formulae I and II may themselves be obtained by diazotising an amine of the formula:

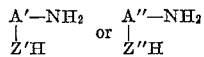

wherein A', A", Z' and Z" have the meanings stated above and —Z'H and —Z"H are in the ortho positions to the —NH₂ groups and coupling the diazo compounds so obtained with coupling components of the acetoacetanilide, phenol, naphthol, naphthylamine, 2:4-dihydroxyquinoline, 1-phenyl-5-pyrazolone or 1-naphthyl-5-pyrazolone series, the said amines and the said coupling components being so chosen that each pair of the resulting azo compounds of Formula I and Formula II contain a single sulphonic acid group and one or two of the groups represented by X.

The 1:1-chromium complexes of the azo compounds of Formula I or Formula II may themselves be obtained by heating the said azo compounds with a salt of trivalent chromium, such as chromium triacetate, in water or in a mixture of water and a water-miscible organic liquid such as ethylene glycol, until the 1:2-chromium complex is formed, adding an acid such as hydrochloric or sulphuric acid, heating until the 1:2-chromium complex is converted to the 1:1-chromium complex, and adding sodium chloride to precipitate the complex. Alternatively the said azo compounds can be heated with a salt of chromium, such as chromium sulphate or chromium formate in water containing an acid such as sulphuric acid.

As examples of amines of the formula

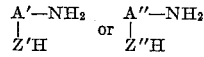

which may be used to obtain the azo compounds of Formulae I and II there may be mentioned:

anthranilic acid,
4-, 5- or 6-chloroanthranilic acid,
4- or 5-nitroanthranilic acid,
5-sulphoanthranilic acid,
5-acetylaminoanthranilic acid,
5-benzoylaminoanthranilic acid,
anthranilic acid 5-sulphonamide,
anthranilic acid 5-methylsulphone,
1-amino-2-naphthol-4-sulphonic acid,
1-amino-2-naphthol-4-sulphonamide,
6-nitro-1-amino-2-naphthol-4-sulphonic acid,
6-nitro-1-amino-2-naphthol-4-sulphonamide,
2-aminophenol, 2-aminophenol-4-sulphonic acid,
2-aminophenol-6-sulphonic acid,
4-, 5- or 6-nitro-2-aminophenol,
4- or 6-chloro-2-aminophenol,
4:6-dinitro-2-aminophenol,
3:4:6-trichloro-2-aminophenol,
4-chloro-2-aminophenol-6-sulphonic acid,
4-chloro-5-nitro-2-aminophenol,
4-methoxy-2-aminophenol,
4-methyl-2-aminophenol,
6-nitro-2-aminophenol-4-sulphonic acid,
2-aminophenol-4-methylsulphone,
2-aminophenol-4-ethylsulphone,
5-nitro-2-aminophenol-4-methylsulphone,
2-aminophenol-4-sulphonamide,
2-aminophenol-4-sulphon-N-methylamide,
2-aminophenol-4-sulphon-N-ethylamide,
2-aminophenol-4-sulphon-N-β-hydroxyethylamide,
2-aminophenol-5-sulphonamide,
4-chloro-2-aminophenol-5-sulphonamide,
2-aminophenol-4-sulphone-N-β-hydroxyethylamide,
2-aminophenol-4-sulphonmorpholide,
2-aminophenol-4-sulphonanilide,
2-aminophenol-4-sulphon-N-methylanilide,
2-aminophenol-5-sulphondimethylamide,
4-methyl-5-nitro-2-aminophenol,
2-aminophenol-4- or 5-sulphon-N:N-di(β-hydroxyethylamide),
4-acetylamino-2-aminophenol,
4-chloroacetylamino-2-aminophenol,
4-acryloylamino-2-aminophenol,
4- or 5-acryloylamino-anthranilic acid,
2-aminophenol-4-sulphonpropylamide,
2-amino-4-(γ-chloro-β-hydroxypropylsulphonyl)phenol,
2-aminophenol-4-β-(methanesulphonyloxy)ethylsulphone,
2-aminophenol-4-β-(acetoxy)ethylsulphone,
1-amino-2-naphthol-5-sulphonamide and
4- or 5-chloroacetylaminoanthranilic acid.

As examples of the said coupling components which may be used to obtain the monoazo compounds of Formulae I and II there may be mentioned phenols such as:

p-cresol,
4-hydroxydiphenyl,
4-acetylaminophenol,
2- or 3-acetylamino-4-methylphenol,
2- or 3-acryloylamino-4-methylphenol,
4-chloroacetylaminophenol and
2- or 3-chloroacetylamino-4-methylphenol;

acetoacetanilides such as:

acetoacetanilide,
acetoacetanilide-4-sulphonic acid,
3- or 4-(3'-hydroxyprop-1':2'-enylsulphonyl) acetoacetanilide,
3- or 4-(γ-chloro-β-hydroxypropylsulphonyl) acetoacetanilide,
4-acryloylamino-acetoacetanilide,
acetoacet-2- or -4-anisidide, acetoacet-4-chloroanilide,
acetoacet-4-(chloroacetylamino)anilide, and
4-(γ-chloro-β-hydroxypropoxy)acetoacetanilide;

naphthols such as:

2-naphthol,
2-naphthol-6- or -8-sulphonic acid,
6-bromo-2-naphthol,
6-acetyl-2-naphthol,
1-benzoylamino-7-naphthol,
1-acetylamino-7-naphthol,
1-propionylamino-7-naphthol,
1-benzenesulphonylamino-7-naphthol,
1-chloroacetylamino-4-, 6- or 7-naphthol,
1-acryloylamino-4-, 6- or 7-naphthol,
2-acryloylamino-6- or -7-naphthol,
1-carbomethoxyamino-7-naphthol,
1-carboethoxyamino-7-naphthol,
1-carboisopropoxyamino-7-naphthol,
1-phenylamino-7-naphthol,
1-β-chloropropionylamino-4-, 6- or 7-naphthol,
2-naphthol-6-sulphonamide,
1-naphthol-3-sulphonamide,
1-naphthol-4-sulphonic acid,
1-naphthol-4-sulphonamide,
1-naphthol-5-sulphonamide,
5-chloro-1-naphthol,
5:8-dichloro-1-naphthol,
5:6:7:8-tetrahydro-2-naphthol,
5:6:7:8-tetrahydro-2-naphthol-3-sulphonic acid,
2-(chloroacetylamino)-6- or 7-naphthol,
1-carboethoxyamino-4-naphthol,
1-acetylamino-4-naphthol,
2-β-chloropropionylamino-5-naphthol-7-sulphonic acid,
2-β-chloropropionylamino-8-naphthol-6-sulphonic acid,
2-acetylamino-5-naphthol-7-sulphonic acid,
2-acryloylamino-5-naphthol-7-sulphonic acid,
2-acryloylamino-8-naphthol-6-sulphonic acid,
2-acetylamino-8-naphthol-6-sulphonic acid,
6-(γ-hydroxyprop-1':2'-enylsulphonyl)-2-naphthol, and
6-(γ-chloro-β-hydroxypropylsulphonyl)-2-naphthol;

1 - phenyl - 5 - pyrazolones and 1-naphthyl-5-pyrazolones such as:

1-phenyl-3-methyl-5-pyrazolone,
1-phenyl-3-carboethoxy-5-pyrazolone,
1-(2'-, 3'- or 4'-methylphenyl)-3-methyl-5-pyrazolone,
1-(2'-, 3'-, or 4'-sulphophenyl)-3-methyl-5-pyrazolone,
1-(2'-, 3'- or 4'-methoxyphenyl)-3-methyl-5-pyrazolone,
1-(2'-, 3'- or 4'-chlorophenyl)-3-methyl-5-pyrazolone,
1-(2'-, 3'- or 4'-nitrophenyl)-3-methyl-5-pyrazolone,
1-(2':5'-dichloro-4'-sulphophenyl)-3-methyl-5-pyrazolone,
1-(3'- or 4'-acryloylaminophenyl)-3-methyl-5-pyrazolone,
1-(3'- or 4'-chloroacetylaminophenyl)-3-methyl-5-pyrazolone,
1-(3'- or 4'-β-chloropropionylaminophenyl)-3-methyl-5-pyrazolone,
1-(5'-acryloylamino-2'-methylphenyl)-3-methyl-5-pyrazolone,
1-[3'- or 4'-(γ-chloro-β-hydroxypropylsulphonyl)phenyl]-3-methyl-5-pyrazolone,
1-[3'- or 4'-(γ-hydroxyprop-1':2'-enylsulphonyl)phenyl]-3-methyl-5-pyrazolone,
1-(3'-amino-4'-sulphophenyl)-3-methyl-5-pyrazolone,
1-(4'-sulphonaphth-1'-yl)-3-methyl-5-pyrazolone,
1-(6'-sulphonaphth-2'-yl)-3-methyl-5-pyrazolone,
1-(4'-sulphamylnapth-1'-yl)-3-methyl-5-pyrazolone,
1-[4'-(γ-chloro-β-hydroxypropoxy)phenyl]-3-methyl-5-pyrazolone and
1-(3'-β-hydroxyethylsulphamylphenyl)-3-methyl-5-pyrazolone;

and naphthylamine coupling components such as:

2-naphthylamine,
2-naphthylamine-6-sulphonic acid,
2-naphthylamine-6-sulphonamide,
2-naphthylamine-7-sulphonic acid,
2-naphthylamine-6-β-hydroxyethylsulphone and
2-amino-6-(γ-hydroxyprop-1':2'-enylsulphon)naphthalene Alternatively the chromium-containing dyestuffs of the invention wherein X represents an acryloylamino, chloroacetylamino or β-chloropropionylamino group can be obtained by treating a chromium-containing azo compound of the formula:

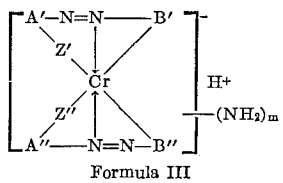

Formula III wherein A', A", B', B", Z', Z" and m have the meanings stated, with acryloyl chloride, chloroacetyl chloride or β-chloropropionyl chloride.

This reaction may be brought about by adding one of the said acid chlorides to a solution of the chromium-containing azo compound in water or in a water-soluble organic liquid or in a mixture of water and a water-soluble organic liquid, stirring the mixture, preferably at a temperature between 0° and 50° C., whilst maintaining the mixture neutral to litmus by the addition of sodium carbonate, adding sodium chloride and filtering off the precipitated dyestuff.

The chromium-containing azo compounds of Formula III may themselves be obtained by reacting together an azo compound of Formula I and a 1:1-chromium complex of an azo compound of Formula II, the two azo compounds together containing a single sulphonic acid group and one or two primary amino groups or one or two groups, such as nitro or acetylamino groups, which can subsequently be converted to primary amino groups.

Alternatively the chromium-containing azo dyestuffs of the invention wherein X represents a

or —SO$_2$CH$_2$CH$_2$OSO$_2$R group can be obtained by treating a chromium-containing azo compound of the formula:

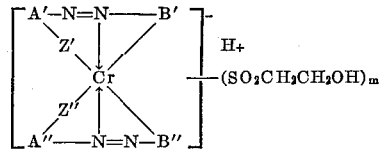

wherein A', A", B', B", Z', Z" and m have the meanings stated, with an acid chloride of the formula:

or R.SO$_2$Cl, wherein R has the meaning stated.

This reaction may be conveniently brought about by stirring the chromium-containing azo compound and the acid halide together in pyridine, preferably at a temperature between 0° and 40° C., adding diethyl ether or an aqueous solution of sodium chloride and filtering off the precipitated dyestuff.

As examples of the said acid halides there may be mentioned acetyl chloride, propionyl chloride, butyryl chloride, benzoyl chloride, tolyl chloride, chlorobenzoyl chloride, nitrobenzoyl chloride, anisyl chloride, methanesulphonyl chloride, ethanesulphonylchloride, benzenesulphonyl chloride, p-toluenesulphonyl chloride, p-chlorobenzene sulphonyl chloride and m-nitrobenzenesulphonyl chloride.

The chromium-containing azo compounds of Formula IV may themselves be obtained by reacting together an azo compound of Formula I and a 1:1-chromium complex of an azo compound of Formula II, the two azo compounds together containing a single sulphonic acid group and one or two —SO$_2$CH$_2$CH$_2$OH groups.

One preferred class of the chromium-containing azo dyestuffs of the invention are the chromium-containing azo dyestuffs which, in the form of the free acids, are represented by the formula:

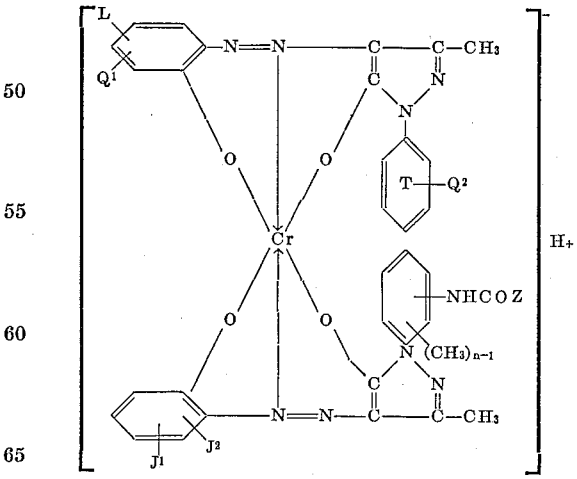

wherein Z is selected from the class consisting of

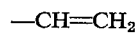

and —CH$_2$CH$_2$Cl; n is a positive integer not exceeding 2; one of Q$^1$ and Q$^2$ represents a hydrogen atom and the other of Q$^1$ and Q$^2$ represents a sulphonic acid group; L and J$^1$ are selected from the class consisting of hydrogen, chlorine and nitro; J$^2$ is selected from the class consisting of chlorine and nitro; and any further substituents on the benzene ring T are selected from the class consisting of methyl, methoxy, nitro and chlorine.

A second preferred class of the chromium-containing azo dyestuffs of the invention are the chromium-containing azo dyestuffs which, in the form of the free acids, are represented by the formula:

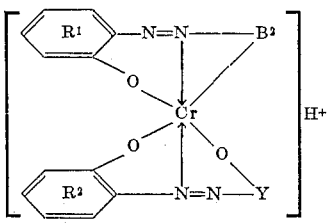

wherein Y represents a naphthalene radical which is substituted by a sulphonic acid group and by a group selected from the class consisting of acryloylamino and β-chloropropionylamino groups, the oxygen atom and the azo group being attached, in ortho position to each other, to the 1- and 2-positions of said naphthalene radical; $B^2$ represents the radical of a coupling component selected from the class consisting of coupling components of the naphthol and 1-phenyl-5-pyrazolone series; and any substituents on the benzene rings $R^1$ and $R^2$ are selected from the class consisting of chlorine, nitro, methyl, methoxy, lower alkylsulphonyl, sulphamyl, lower alkyl sulphamyl and hydroxy lower alkyl sulphamyl.

It is preferred that $B^2$ represents the radical of 2-naphthol.

A third preferred class of the chromium-containing azo dyestuffs of the invention are the chromium-containing azo dyestuffs which, in the form of the free acids, are represented by the formula:

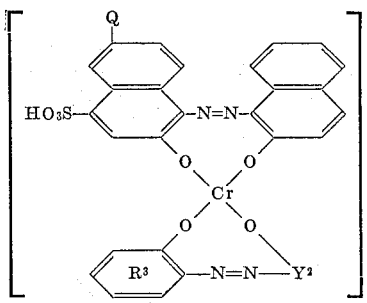

wherein Q is selected from the class consisting of hydrogen and nitro; $Y^2$ represents a naphthalene radical which is substituted by a group selected from the class consisting of acryloylamino and β-chloropropionylamino groups, the oxygen atom and the azo group being attached, in ortho position to each other, to the 1- and 2-positions of said naphthalene radical; and any substituents on the benzene ring $R^3$ are selected from the class consisting of chlorine, nitro, methyl, methoxy, lower alkyl sulphonyl, sulphamyl, lower alkyl sulphamyl and hydroxy lower akyl sulphamyl.

The chromium-containing azo dyestuffs of the invention are of value for colouring textile materials, in particular nitrogen-containing textile materials for example textile materials comprising natural and regenerated protein fibres such as wool and silk, textile materials comprising synthetic nitrogen-containing fibres for example polyamide fibres such as fibres of polyhexamethyleneadipamide and the polymer from caprolactam, polyurethane fibres and polyacrylonitrile fibres especially modified polyacrylonitrile fibres. The said dyestuffs can also be used for colouring leather and natural and regenerated cellulose fibres.

The chromium-containing azo dyestuffs can be applied to the said textile materials by either a dyeing or a printing process. For dyeing nitrogen-containing textile materials such as wool the new dyestuffs are preferably applied to the said textile materials from a neutral, acid or slightly alkaline dyebath, preferably at a temperature between 70° and 120° C. The dyeing process can be carried out at a constant or substantially constant pH, that is to say the pH of the dyebath remains constant or substantially constant during the dyeing process, or if desired, the pH of the dyebath can be altered at any stage of the dyeing process by the addition of acids or acid salts or alkalis or alkaline salts. For example dyeing may be started at a dyebath pH of about 3.5 to 5.5 and raised during the dyeing process to about 6.7 to 7.5, or higher if desired. The dyebath may also contain substances which are commonly used in the dyeing of nitrogen-containing textile materials. As examples of such substances there may be mentioned ammonium acetate, sodium sulphate, ethyl tartrate, nonionic dispersing agents such as condensates of ethylene oxide with amines, fatty alcohols or phenols, surface-active cationic agents such as quaternary ammonium salts for example cetyltrimethylammonium bromide, anionic surface-active agents such as sodium dinaphthyl methane disulphonate, sodium oleyl sulphate, sodium lauryl sulphate, sodium isopropyl nathhalene sulphonate and the dioctyl ester of sodium sulphosuccinate, and organic liquids such as n-butanol and benzyl alcohol.

The chromium-containing azo dyestuffs have excellent affinity for nitrogen-containing textile materials, especially woolen textile materials, and the dyeings produced have excellent fastness to light and to wet treatments such as washing and in particular to milling, to potting and to acid cross dyeing. It is believed that the excellent fastness to wet treatments of the dyeings is due, at least in part, to a chemical reaction occurring between the reactive group or groups present in the dyestuffs and the textile material so that the dyestuffs become attached to the textile materials through chemical bonds. The said dyestuffs also yield level dyeings on woolen textile materials, which dyeings are also free from the fibre to fibre unlevelness known as skitteriness.

The chromium containing azo dyestuffs, as hereinbefore defined, are superior to the corresponding chromium-containing azo dyestuffs which contain the same reactive groups but which contain at least two sulphonic acid groups since they give more level dyeings when applied to woolen textile materials.

The invention is illustrated but not limited by the following examples in which the parts and percentages are by weight.

*Example 1*

A mixture of 3.45 parts (.0075 mols) of the 1:1-chromium complex of 1-(2'-hydroxynapth-1'-ylazo)-2-hydroxy-6-napthylamine-4-sulphonic acid, 2.43 parts (.0075 mols) of 1-(2'-hydroxy-5'-nitrophenylazo)-2-hydroxy-6 - aminonapthalene, 0.8 part of sodium carbonate and 150 parts of water is stirred for 2 hours at a temperature between 90° and 100° C. 15 parts of sodium chloride are then added and the precipitated solid is filtered off. The resulting solid is stirred in 200 parts of water at a temperature of 75° C., 20 parts of sodium chloride are added and the precipitated solid is filtered off and dried. 3.13 parts of the resulting 1:2-chromium complex are dissolved in a mixture of 300 parts of water, 200 parts of dioxan and 40 parts of acetone and 5.4 parts of chloroacetylchloride are then gradually added, the temperature of the resulting mixture being maintained between 0° and 5° C. by external cooling and the pH of the mixture being maintained between 6 and 7 by the addition of sodium acetate. The resulting mixture is then stirred for 30 minutes, 1000 parts of a saturated aqueous solution of sodium chloride are added and the precipitated dyestuff is filtered off, washed with a 5% aqueous solution of sodium chloride and dried.

When applied to wool from a neutral or slightly acid dyebath the dyestuff yields grey shades possessing excellent fastness to wet treatments and to light.

The 1:1-chromium complex of 1-(2'-hydroxynapth-1'-ylazo)-2-hydroxy-6 - naphthylamine-4 - sulphonic acid used in the above example may be obtained as follows:

15.4 parts of the sodium salt of 1-(2'-hydroxynapth-1'-ylazo)-2-hydroxy-6-nitronaphthalene-4-sulphonic acid, 5.2 parts of chromium acetate and 500 parts of water are stirred together at the boil under a reflux condenser for 20 hours. 16.5 parts of an aqueous solution of sodium potassium chrome-salicylate are then added and the mixture is again stirred at the boil for 4 hours. The resulting solution is cooled to 70° C., 16 parts of sodium sulphide crystals are added and the mixture stirred for 45 minutes at 70 to 80° C. The solution is cooled to 20° C., made acid to Congo Red by the addition of a concentrated aqueous solution of hydrochloric acid, 30 parts of sodium chloride are added and the precipitated solid is filtered off. The resulting solid is dissolved in hot water containing sodium carbonate, the solution is filtered, sodium chloride is added to the filtrate and the precipitated solid is filtered off. A mixture of this solid, 220 parts of ethylene glycol, 200 parts of water, 7.1 parts of chromium acetate and 30 parts of a 2N aqueous solution of hydrochloric acid is stirred at the boil under a reflux condenser for 24 hours. The mixture is then distilled until most of the liquid has been removed, 600 parts of a saturated aqueous solution of sodium chloride are added and the precipitated 1:1-chromium complex is filtered off, washed with a 10% aqueous solution of sodium chloride and dried.

*Example 2*

A mixture of 2.52 parts (.005 mol) of the 1:1-chromium complex of 1-(2'-hydroxy-6'-aminonaphth-1'-ylazo)-2-hydroxy-6-nitronaphthalene-4-sulphonic acid, 1.62 parts (.005 mol) of 1 - (2'-hydroxy-5'-nitrophenylazo)-2-hydroxy-6-aminonaphthalene, 0.53 part of sodium carbonate and 150 parts of water is stirred for 2 hours at a temperature between 90° and 100° C. 15 parts of sodium chloride are then added and the precipitated solid is filtered off. The resulting solid is stirred in 200 parts of water at a temperature of 75° C., 20 parts of sodium chloride are added and the precipitated solid is filtered off and dried. 3.31 parts of the resulting 1:2-chromium complex are dissolved in a mixture of 230 parts of β-ethoxyethanol and 250 parts of water and 5.4 parts of chloroacetyl chloride are slowly added during 1½ hours, the temperature of the resulting mixture being maintained between 0° and 5° C. by external cooling and the pH of the mixture being maintained between 6 and 7 by the addition of sodium acetate. The mixture is stirred for a further hour and 1200 parts of a saturated aqueous solution of sodium chloride are then added. The precipitated dyestuff is then filtered off, washed with a 5% aqueous solution of sodium chloride and dried.

On analysis the dyestuff is found to contain 1.81 atoms of organically bound chlorine per molecule of dyestuff. When applied to wool from a neutral or slightly acid dyebath the dyestuff yields grey shades possessing excellent fastness to light and to wet treatments.

The 1:1-chromium complex of 1-(2'-hydroxy-6'-aminonaphth-1'-ylazo)-2-hydroxy-6 - nitronaphthalene - 4 - sulphonic acid used in the above example may be obtained as follows:

A mixture of 16 parts of the sodium salt of 1-(2'-hydroxy - 6' - aminonaphth - 1' - ylazo) - 2-hydroxy-6-nitronaphthalene-4-sulphonic acid, 14.15 parts of chromium acetate, 200 parts of water and 230 parts of ethylene glycol is stirred at the boil under a reflux condenser for 1 hour. 30 parts of a 2N aqueous solution of hydrochloric acid are then added and the mixture is stirred for 54 hours at the boil under a reflux condenser. The resulting mixture is cooled to 20° C., 700 parts of a saturated aqueous solution of sodium chloride are added, and the precipitated 1:1-chromium complex is filtered off, washed with a 10% aqueous solution of sodium chloride and dried.

*Example 3*

A mixture of 4.08 parts (.0092 mols) of the 1:1-chromium complex of 1-(1'-hydroxynaphth-2'-ylazo)-2-hydroxy-6-nitronaphthalene-4 - sulphonic acid and 3.15 parts (.0084 mol) of 1-acryloylamino-8-(2'-hydroxy-5'-nitrophenylazo)-7-naphthol (which is obtained by coupling diazotised 4-nitro-2-aminophenol with 1-acryloylamino-7-naphthol in alkaline medium), 0.75 part of sodium carbonate, 100 parts of water and 40 parts of ethanol is stirred for 2 hours at the boil under a reflux condenser. The mixture is then cooled to 20° C., 15 parts of sodium chloride are added and the precipitated dyestuff is filtered off, washed with a 10% aqueous solution of sodium chloride and dried.

When applied to wool from a neutral or wool dyebath the dyestuff yields greenish-grey shades possessing excellent fastness to wet treatments and to light.

The 1:1-chromium complex of 1-(1'-hydroxynaphth-2'-ylazo) - 2 - hydroxy - 6-nitronaphthalene-4-sulphonic acid used in the above example may be obtained as follows:

A mixture of 23 parts of the sodium salt of 1-(1'-hydroxynaphth-2'-ylazo) - 2 - hydroxy - 6-nitronaphthalene-4-sulphonic acid, 450 parts of ethylene glycol, 28.3 parts of chromium acetate and 300 parts of water is stirred at the boil under a reflux condenser for 24 hours. 80 parts of a 2N aqueous solution of hydrochloric acid are then added and the mixture is stirred at the boil for a further 20 hours. 1400 parts of a saturated aqueous solution of sodium chloride are then added and the precipitated solid is filtered off, washed with a 10% aqueous solution of sodium chloride and dried.

*Example 4*

A solution of 1.74 parts (0.004 mole) of the sodium salt of the monoazo compound obtained by diazotising 2-amino phenol-4-sulphonic acid and coupling with 1-acrylamido-6-naphthol in alkaline medium, in a mixture of 25 parts of β-ethoxyethanol and 75 parts of water containing 0.22 part of sodium carbonate, is added during 15 minutes with stirring to a solution of 1.56 parts (0.004 mole) of the 1:1-chromium complex of the monoazo compound obtained by diazotising 4-nitro-2-aminophenol and coupling with 1-phenyl-3-methyl-5-pyrazolone in alkaline medium in 70 parts of β-ethoxyethanol at 95° to 100° C. The mixture is then stirred at 95° to 100° C. for a further 30 minutes, cooled to 20° C., filtered and the filtrate is poured into 900 parts of a saturated aqueous solution of sodium chloride. The precipitate is filtered off and the filter cake is dissolved in 200 parts of water at 75° to 80° C. 30 parts of sodium chloride are added and the precipitated dye is filtered off and dried.

The product obtained dyes wool in reddish brown shades possessing excellent fastness to light and to wet treatments.

The following table gives further examples of the dyestuffs of the invention which are obtained by methods similar to those described in Examples 3 and 4, the 1:1-chromium complex compounds used in these examples being replaced by the equivalent amounts of the 1:1-chromium compounds of the monoazo dyes obtained from the diazo- and coupling components named in Columns I and II and the metal free dyestuff compounds used in these examples being replaced by the metal free dyestuffs obtained from the diazo- and coupling components named in Columns III and IV. Column V indicates the shades obtained when the dyestuffs are applied to wool.

| Ex. | 1:1-complex chromium compound | | Metal-free dyestuff | | Shade |
|---|---|---|---|---|---|
| | I | II | III | IV | V |
| 5 | 6-nitro-1-amino-2-naphthol-4-sulphonic acid. | 2-naphthol | 4-nitro-2-aminophenol | 1-acryloylamino-7-naphthol | Grey. |
| 6 | ___do___ | ___do___ | 5-nitro-2-aminophenol | ___do___ | Do. |
| 7 | 1-amino-2-naphthol-4-sulphonic acid. | ___do___ | 5-sulphamyl-2-aminophenol | ___do___ | Navy blue. |
| 8 | ___do___ | ___do___ | 5-nitro-2-aminophenol | 4-acryloylamino-acetoacetanilide. | Reddish violet. |
| 9 | 2-aminophenol-4-sulphonic acid. | 1-phenyl-3-methyl-5-pyrazolone. | 4-sulphamyl-2-aminophenol | 1-acryloylamino-4-naphthol | Reddish brown. |
| 10 | 1-amino-2-naphthol-4-sulphonic acid. | 5:8-dichloro-1-naphthol. | 4-acryloylamino-2-aminophenol. | 6-acetyl-2-naphthol | Reddish blue. |
| 11 | 2-aminophenol-4-sulphonic acid. | 1-acetyl-amino-7-naphthol. | ___do___ | 1(2'-acrylamido-phenyl)-3-methyl-5-pyrazolone. | Bluish brown. |
| 12 | 6-nitro-2-aminophenol-4-sulphonic acid. | 2-naphthyl-amine | ___do___ | 2-naphthylamine | Greenish grey. |
| 13 | 1-amino-2-naphthol-4-sulphonic acid. | 2-naphthol | 2-aminophenol-4-sulphonamide. | 4-acryloylamino-acetoacetanilide. | Dull green. |
| 14 | 4-chloro-2-aminophenol-6-sulphonic acid. | 2:4-dihydroxyquinoline. | 4-N-methyl-acryloylamino-2-aminophenol. | 2-naphthol | Reddish violet. |
| 15 | 1-amino-2-naphthol-4-sulphonic acid. | 2-naphthol | 4-chloro-2-amino-phenol | 1-acryloylamino-4-naphthol | Navy blue. |
| 16 | ___do___ | ___do___ | ___do___ | 1-acryloylamino-7-naphthol | Do. |
| 17 | ___do___ | ___do___ | 5-chloro-2-aminophenol | ___do___ | Do. |
| 18 | ___do___ | ___do___ | 6-nitro-4-tert.-butyl-2-aminophenol. | ___do___ | Do. |
| 19 | 2-aminophenol-4-sulphonic acid. | 1-phenyl-3-methyl-5-pyrazolone. | 5-nitro-2-aminophenol | 2-acryloylamino-7-naphthol | Brown. |
| 20 | ___do___ | ___do___ | 4:6-dinitro-2-aminophenol | 2-acryloylamino-4-methyl-phenol. | Yellowish brown. |
| 21 | 4-methoxy-2-aminophenol | 1-naphthol-3-sulphonamide. | 4-sulphoanthranilic acid | 1-(4'-acryloylaminophenyl)-3-methyl-5-pyrazolone. | Dark green. |
| 22 | 1-amino-2-naphthol-4-sulphonic acid. | 2-naphthol | Anthranilic acid | 1-(4'-acryloylaminophenyl)-3-methyl-5-pyrazolone. | Dark bluish green. |
| 23 | 1-amino-2-naphthol-4-sulphonic acid. | ___do___ | 2-aminophenol-5-sulphonamide. | 1-acryloylamino-4-naphthol | Navy blue. |
| 24 | ___do___ | ___do___ | 4-chloro-2-aminophenol-5-sulphonamide. | ___do___ | Do. |
| 25 | ___do___ | ___do___ | ___do___ | 1-acryloylamino-7-naphthol | Do. |
| 26 | ___do___ | ___do___ | 2-aminophenol-4-sulphonamide. | ___do___ | Do. |
| 27 | 6-nitro-1-amino-2-naphthol-4-sulphonic acid. | ___do___ | 2-aminophenol-5-sulphonamide. | 1-acryloylamino-4-naphthol | Bluish black. |
| 28 | 2-aminophenol-4-sulphonic acid. | 1-phenyl-3-methyl-5-pyrazolone. | 4-nitro-2-aminophenol | 1-acryloylamino-7-naphthol | Yellowish brown. |
| 29 | ___do___ | ___do___ | 2-aminophenol-4-sulphonamide. | ___do___ | Reddish brown. |
| 30 | ___do___ | ___do___ | 4-nitro-2-aminophenol | 1-acryloylamino-4-naphthol | Do. |
| 31 | 4-nitro-2-aminophenol | ___do___ | 4-chloro-2-aminophenol-6-sulphonic acid. | ___do___ | Bluish brown. |
| 32 | 1-amino-2-naphthol-4-sulphonic acid. | 5:8-dichloro-1-naphthol. | 4-chloro-2-aminophenol | 1-acryloylamino-7-naphthol | Navy blue. |
| 33 | ___do___ | ___do___ | 2-aminophenol-4-sulphonamide. | ___do___ | Do. |
| 34 | 4:6-dinitro-2-amino-phenol | 1-naphthylamine-4-sulphonic acid. | ___do___ | 1-(4'-acryloylamino-phenyl)-3-methyl-5-pyrazolone. | Yellowish green. |
| 35 | 6-nitro-2-aminophenol-4-sulphonic acid. | 2-naphthylamine | 5-acryloylamino anthranilic acid. | ___do___ | Green. |
| 36 | 2-aminophenol-5-sulphonamide. | 2-naphthol | 2-aminophenol-4-sulphonic acid. | ___do___ | Reddish brown. |
| 37 | 4-nitro-2-aminophenol | 1-phenyl-3-methyl-5-pyrazolone. | ___do___ | ___do___ | Orange. |
| 38 | 6-nitro-1-amino-2-naphthol-4-sulphonic acid. | 1-amino-4-naphthol | 4-nitro-2-aminophenol | 1-acryloylamino-7-naphthol | Greenish grey. |
| 39 | ___do___ | 2-naphthol | ___do___ | 1-acryloylamino-4-naphthol | Black. |
| 40 | ___do___ | 1-naphthol | ___do___ | ___do___ | Do. |
| 41 | 2-aminophenol-4-sulphonic acid. | 1-phenyl-3-methyl-5-pyrazolone. | 4-nitro-2-aminophenol | 1-acryloylamino-6-naphthol | Reddish borwn. |
| 42 | ___do___ | ___do___ | 4-chloro-2-aminophenol | ___do___ | Do. |
| 43 | 1-amino-2-naphthol-4-sulphonic acid. | 2-naphthol | 2-aminophenol-4-sulphonamide. | ___do___ | Navy blue. |
| 44 | ___do___ | ___do___ | 4-chloro-2-aminophenol | ___do___ | Do. |
| 45 | ___do___ | ___do___ | 4-nitro-2-aminophenol | ___do___ | Do. |
| 46 | ___do___ | ___do___ | 4-chloro-2-aminophenol-5-sulphonamide. | ___do___ | Navy blue. |
| 47 | ___do___ | ___do___ | 2-aminophenol-5-sulphonamide. | ___do___ | Do. |
| 48 | 6-nitro-1-amino-2-naphthol-4-sulphonic acid. | ___do___ | 2-aminophenol-4-sulphonamide. | ___do___ | Dull violet. |
| 49 | ___do___ | ___do___ | 4-nitro-2-aminophenol | ___do___ | Reddish grey. |
| 50 | ___do___ | ___do___ | 2-aminophenol-5-sulphonamide. | ___do___ | Bluish grey. |
| 51 | ___do___ | ___do___ | 4-chloro-2-aminophenol-5-sulphonamide. | ___do___ | Do. |
| 52 | 6-nitro-2-aminophenol-4-sulphonic acid. | 2-naphthol | 2-aminophenol-5-sulphonamide. | 1-acryloylamino-6-naphthol | Blue black. |
| 53 | ___do___ | ___do___ | 4-chloro-2-aminophenol-5-sulphonamide. | ___do___ | Do. |
| 54 | ___do___ | ___do___ | ___do___ | 1-acryloylamino-4-naphthol | Do. |
| 55 | ___do___ | ___do___ | 2-aminophenol-5-sulphonamide. | ___do___ | Do. |
| 56 | ___do___ | ___do___ | 4-chloro-2-aminophenol | ___do___ | Do. |
| 57 | ___do___ | ___do___ | 4-nitro-2-aminophenol | ___do___ | Do. |
| 58 | 2-aminophenol-4-sulphonic acid. | ___do___ | ___do___ | ___do___ | Do. |
| 59 | ___do___ | ___do___ | 4-chloro-2-aminophenol-5-sulphonamide. | ___do___ | Do. |

Example 60

A mixture of 1.68 parts (0.00333 mole) of the 1:1-chromium complex of the monoazo compound obtained by coupling 4:6-dinitro-2-aminophenol with 1-naphthylamine-4-sulphonic acids, 1.32 parts (0.00333 mole) of the monoazo compound obtained by coupling 4:6-dinitro-2-aminophenol with 4-chloroacetylaminophenol, 40 parts of ethanol and 100 parts of water is stirred at the boil under a reflux condenser for 4 hours, the pH of the reaction mixture being maintained at 7–7.5 by the addition of 10% aqueous sodium carbonate solution as necessary. The mixture is filtered and the filtrate is poured into 700 parts of a saturated aqueous solution of sodium chloride. A further 80 parts of sodium chloride is added to the mixture and the whole is heated to 60–65° C. to coagulate the precipitate. The dyestuff is filtered off and the filter cage is dissolved in 200 parts of water and reprecipitated by adding 50 parts of sodium chloride. The filtered dyestuff is then dried.

The product dyes wool in dull green shades having excellent fastness to wet treatments and to light.

The following table gives further examples of the dyestuffs of the invention. These are obtained by methods essentially similar to that of Example 60, i.e. heating at a pH of 7 to 7.5, a mixture of the 1:1-chromium complex of the monoazo compound obtained from the diazo and coupling components named in Columns I and II, and the metal-free monoazo compounds obtained from the diazo and coupling components named in Columns III and IV. Column V indicates the shades of dyeings on wool.

cipitate is filtered off. The filter cake is dissolved in 500 parts of water and reprecipitated by adding 125 parts of sodium chloride. The precipitate is filtered off and dried.

Example 65

In place of the 1:1-chromium complex used in Example 73 there are used 2.43 parts of the sodium salt of the mixed 1:2 - chromium complex of 1 - (2' - methoxyphenyl) - 3 - methyl - 4 - (2" - hydroxy - 5" - β - hydroxyethylsulphonylphenylazo) - 5 - pyrazolone and 8-(5' - nitro - 3' - sulpho - 2' - hydroxyphenylazo) - 1-acetylamino - 7 - naphthol, whereby a dyestuff is obtained which dyes wool in yellowish-brown shades possessing excellent fastness to wet treatments and to light.

The mixed 1:2-chromium complex used in the above example can be obtained as follows:

A mixture of 1.61 parts (0.0033 mole) of the 1:1-chromium complex of the monoazo compound obtained by coupling 2 - aminophenol - 4 - β - hydroxyethylsulphone with 1 - (2' - methoxyphenyl) - 3 - methyl -5 - pyrazolone, 1.56 parts (0.0033 mole) of the sodium salt of the monoazo compound obtained by coupling 4 - nitro-2 - aminophenol - 6 - sulphonic acid with 1 - acetylamino-7-naphthol; 0.53 part of sodium carbonate, 20 parts of ethanol and 126 parts of water is stirred at the boil under a reflux condenser for 30 minutes. The mixture is filtered and the filtrate is poured into 500 parts of a saturated aqueous solution of sodium chloride. 20 parts of sodium chloride are added to the mixture and the precipitate is filtered off. The filter cake is dissolved in 500 parts of water, 100 parts of sodium chloride are added and the precipitate is filtered off and dried.

| Ex. | 1:1-complex chromium compound | | Metal-free compound | | Shade |
|---|---|---|---|---|---|
| | I | II | III | IV | V |
| 61 | 4-chloro-2-aminophenol-6-sulphonic acid. | 2:4-dihydroxyquinoline. | 2-amino-4-(3'-chloro-2'-hydroxypropylsulphonyl)-phenol. | 1-carbethoxyamino-7-7-naphthol. | Violet. |
| 62 | 1-amino-2-naphthol-4-sulphonic acid. | 2-naphthol | 2-aminophenol-4-methyl-sulphone. | 6-(3'-hydroxy-1':2'-propenyl-sulphonyl-2-naphthol. | Reddish blue. |
| 63 | 4-chloro-2-aminophenol-6-sulphonic acid. | 2:4-dihydroxyquinoline. | 2-aminophenol-4-sulphonamide. | 1:4'(3"-chloro-2"-hydroxypropoxy)-phenyl-3-methyl-5-pyrazolone. | Reddish borwn. |

Example 64

To a mixture of 70 parts of dry pyridine and 2.42 parts (0.0025 mole) of the sodium salt of the 1:2-chromium complex of 1 - (2' - hydroxy - 4' - sulphamylphenylazo)-2 - naphthol and 1 - (4' - sulphonaphth - 1' - yl) - 3-methyl - 4 - (2" - hydroxy - 5" - β - hydroxyethylsulphonylphenylazo) - 5 - pyrazolone at 5–10° C. there is added 1.28 parts of benzoyl chloride. The mixture is stirred at 5° to 10° C. for 16 hours, poured into 600 parts of ether. The precipitate is filtered off, and the filter cake is stirred in 300 parts of water and 60 parts of sodium chloride and added. The dyestuff is filtered off and dried. The product dyes wool in brown shades possessing excellent fastness to light and to wet treatments.

The mixed 1:2-chromium complex used in the above example may be obtained as follows:

A mixture of 1.96 parts (.005 mole) of the 1:1-chromium complex compound of the monoazo compound obtained by coupling 2 - aminophenol - 5 - sulphonamide with 2-naphthol, 2.77 parts (0.005 mole) of the sodium salt of the monoazo compound obtained by coupling 2-aminophenol-4-β-hydroxyethylsulphone with 1-(4'-sulphonaphth-1'yl)-3-methyl-5-pyrazolone, 20 parts of ethanol, 125 parts of water and .54 part of sodium carbonate is stirred at the boil under reflux for 3 hours. The mixture is filtered and the filtrate is poured into 400 parts of a saturated aqueous solution of sodium chloride. 30 parts of sodium chloride are added to the mixture and the pre-

Example 66

In place of the 1.28 parts of benzoyl chloride used in Examples 64 and 65 there are used equivalent amounts of methane sulphonyl chloride, or ethane sulphonyl chloride, or benzene sulphonyl chloride, or p-toluene sulphonyl chloride, or m - nitrobenzene sulphonyl chloride, or m-chlorobenzene sulphonyl chloride, or acetyl chloride, or propionyl chloride, or 4-methylbenzoyl chloride when similar dyestuffs are obtained.

Example 67

A mixture of 1.50 parts (0.0033 mole) of the 1:1-chromium complex of the monoazo compound obtained by coupling diazotised 2-aminophenol-4-sulphonic acid with 1-acetylamino-7-naphthol, 1.66 parts of the monoazo compound formed by coupling with the diazo oxide of 6-nitro-1-amino-2-naphthol - 4 - suphonamide with 1 - (5'-amino-2'-methylphenyl)-3-methyl-5-pyrazolone in alkaline medium, 40 parts of ethanol, 100 parts of water and 0.53 part of sodium carbonate is stirred at the boil under a reflux condenser for 2 hours. The mixture is filtered and the filtrate so obtained is poured into 400 parts of a saturated aqueous solution of sodium chloride. The precipitate is filtered off, dissolved in 100 parts of water at 70° C., 25 parts of sodium chloride are added and the reprecipitated dyestuff is filtered off.

The moist filter cake from above is dissolved in a mixture of 25 parts of β-ethoxyethanol and 100 parts of water. The pH of the solution is adjusted to 7 and the temperature is adjusted to between 0° and 5° C. by cooling. The solution is stirred at a temperature between 0° and 5° C. and 5.7 parts of acryloyl chloride are added during 2 hours the pH being maintained at 6–6.5 by the addition of 10% aqueous sodium carbonate solution as necessary and for a further 15 minutes on completion of the addition. The mixture is then poured into 400 parts of a saturated aqueous solution of sodium chloride and the precipitated dyestuff is filtered off. The filter cake is purified by solution in water and salting.

The product dyes wool in reddish brown shades possessing excellent fastness to wet treatments and to light.

*Example 68*

A mixture of 1.8 parts (0.004 mole) of the 1:1-chromium complex of the monoazo compound obtained by coupling 2-aminophenol-4-sulphonic acid with 1-acetyl-amino-7-naphthol, 1.4 parts of the monoazo compound obtained by coupling 4-nitro-2-aminophenol with 1-(4′-aminophenyl)-3-methyl-5-pyrazolone, 0.32 part of sodium carbonate, 1.0 part of ethanol and 100 parts of water is stirred at the boil under a reflux condenser for ¾ hour when formation of the mixed 1:2-chromium complex is complete. The solution is diluted with a mixture of 120 parts of ethanol and 100 parts of water, cooled to between 0° and 5° C. and the pH is adjusted to 7. 4.6 parts of acryloyl chloride are added dropwise during 1½ hours with stirring at between 0° and 5° C. the pH of the solution being maintained at between 6.5 and 7 by the addition of 10% aqueous sodium carbonate solution as necessary. The mixture is poured into 800 parts of a saturated aqueous solution of sodium chloride, the mixture is heated to 65–70° C., and further salted by the addition of 70 parts of sodium chloride. The precipitated dyestuff is filtered off. The filter cake is suspended in 500 parts of water, the suspension is heated to 75–80° C., 50 parts of sodium chloride are added and the dyestuff is filtered off and dried.

The product dyes wool in dark brown shades possessing excellent fastness to wet treatments and to light.

*Example 69*

A mixture of 1.5 parts (0.0033 mole) of the 1:1-chromium complex of the monoazo compound obtained by coupling 2-aminophenol-4-sulphonic acid with 1-acetyl-amino-7-naphthol, 1.08 parts (0.0033 mole) of the monoazo compound obtained by coupling diazotised 4-nitro-2-aminophenol with 2-amino-6-naphthol in alkaline medium, 0.53 part of sodium carbonate, 40 parts of ethanol and 100 parts of water is stirred at the boil under a reflux condenser for 2 hours when formation of the mixed 1:2-chromium complex is completed. The mixture is filtered and the filtrate so obtained is poured into 200 parts of water and the mixture is salted with 100 parts of sodium chloride. The precipitate is filtered off and the filter cake is suspended in 150 parts of water. The mixture is heated to 70° C. and 37 parts of sodium chloride are added and the precipitate is filtered off.

The filter cake of the mixed 1:2-chromium complex is dissolved in a mixture of 25 parts of β-ethoxyethanol and 100 parts of water. The solution is cooled to below 5° C., stirred, and the pH adjusted to 7. 6 parts of β-chloropropionyl chloride are added dropwise during 2 hours at between 0° and 5° C., the pH of the mixture being maintained at between 6 and 6.5 by the addition of 10% aqueous sodium carbonate solution as necessary. The mixture is stirred for 16 minutes after the addition is complete, and is then poured into 400 parts of a saturated aqueous solution of sodium chloride. The precipitated dyestuff is filtered off, the filter cake is stirred in 100 parts of water, 20 parts of sodium chloride are added and the dyestuff is filtered off and dried. The ground dyestuff is stirred in 400 parts of chloroform, filtered and dried.

The product so obtained dyes wool in greenish grey shades possessing excellent fastness to light and to wet treatments.

*Example 70*

A mixture of 1.61 parts (0.0033 mole) of the 1:1-chromium complex of the monoazo compound obtained by coupling diazotised 6-nitro-2-aminophenol-4-sulphonamide with 1-(3′-aminophenyl)-3-methyl-5-pyrazolone, 1.42 parts of the sodium salt of the monoazo compound obtained by coupling diazotised 6-nitro-2-aminophenol-4-sulphonic acid with 1-amino-7-naphthol in alkaline medium, 0.32 part of sodium carbonate, 4 parts of ethanol and 100 parts of water is stirred at the boil under a reflux condenser for 4 hours. The mixture is screened and the pH of the filtrate is adjusted to 7.5 by the addition of 7% aqueous hydrochloric acid solution.

A solution of 2.7 parts of sodium sulphide crystals in 20 parts of water is neutralised at between 0° and 5° C. by the dropwise addition of 2% aqueous hydrochloric acid solution. This solution is added dropwise during 45 minutes to the solution of the mixed 1:2-chromium complex stirred at between 60° and 65° C. The resulting solution is filtered and the filtrate so obtained cooled to below 10° C. and acidified to Congo Red with 36% aqueous hydrochloric acid solution. 10 parts of sodium chloride are added and the precipitate is filtered off. The filter cake is dissolved in 50 parts of water by the addition of sodium carbonate, filtered and the filtrate so obtained salted with 15 parts of sodium chloride and the precipitate is filtered off. The filter cake is dissolved in a mixture of 55 parts of acetone and 100 parts of water. To the solution there is added during 2 hours 12 parts of acryloyl chloride at between 0° and 5° C. with stirring, the pH of the reaction mixture being maintained at between 6 and 6.5 by the addition of 30% aqueous sodium carbonate solution. The solution is stirred at 0° to 5° C. for a further 30 minutes on completion of the addition and then at 20° C. for 16 hours. 15 parts of sodium chloride are added and the precipitate is filtered off. The filter cake is dissolved in 200 parts of water, 30 parts of sodium chloride are added and the mixture is heated to 60–65° C. to coagulate the precipitate which is filtered off and dried.

The product dyes wool in reddish brown shades possessing excellent fastness to light and to wet treatments.

*Example 71*

A hot solution of 1.7 parts (0.004 mole) of the sodium salt of the monoazo compound obtained by diazotising 4-nitro-2-aminophenol and coupling with 2-amino-8-naphthol-6-sulphonic acid in alkaline medium and 0.425 part of sodium carbonate in 100 parts of water and 45 parts of β-ethoxyethanol is added during 30 minutes to a stirred solution having a temperature of 90–95° C., of 1.56 parts (0.004 mole) of the 1:1-chromium complex of the monoazo compound obtained by coupling 4-nitro-2-aminophenol with 1-phenyl-3-methyl-5-pyrazolone. The mixture is stirred at this temperature for 30 minutes. The mixture is cooled to 10° C. and filtered. The filtrate is stirred at between 0° and 5° C., the pH is adjusted to 7 by the addition of 2 N hydrochloric acid solution and 5.7 parts of acryloyl chloride are added during 1 hour the pH being maintained at between 6.5 and 7 by the addition of 10% aqueous sodium carbonate solution as necessary. The mixture is stirred for 15 minutes after addition is complete and the mixture is poured into 1200 parts of a saturated aqueous solution of sodium chloride. The precipitate is filtered off, dissolved in 150 parts of water at 85–90° C., reprecipitated by the addition of 15 parts of sodium chloride and filtered off and dried.

The product dyes wool in yellowish brown shades possessing excellent fastness to light and to wet treatments.

The following table gives further examples of new dyestuffs of the invention which are obtained when the mixed 1:2-chromium complexes, prepared from the 1:1-chromium complexes of the monoazo compounds named in Column I and the metal-free azo compounds named in Column II are acylated with the acid chloride (using an excess) listed in Column III by methods similar to those given in Examples 67–71. Column IV indicates the shades obtained when the dyestuffs are applied to wool.

of sodium chloride are added and the dyestuff is then filtered off and dried.

When applied to wool from a neutral or weakly acid dyebath, the dyestuff yields yellowish-red shades possessing excellent fastness to light and to wet treatments.

| Ex. | I<br>1:1-chromium complex compound | II<br>Metal-free dyestuff | III<br>Acid chloride | IV<br>Test on wool |
|---|---|---|---|---|
| 72 | 4-(2″-hydroxy-3″-nitro-5″-sulphamyl-phenylazo)-1-(5′-aminophenyl)-3-methyl-5-pyrazolone. | 8-(3′-nitro-2′-hydroxy-5′-sulphophenyl-azo)-1-amino-7-naphthol. | Acryloyl chloride | Reddish brown. |
| 73 | 4-(2″-hydroxy-4″-aminophenylazo)-1-(3′-aminophenyl)-3-methyl-5-pyrazolone. | 3-(5′-chloro-2′-hydroxy-3′-sulphophenyl-azo)-1-acryloylamino-4-naphthol. | do | Bluish violet. |
| 74 | 3-(2′-hydroxy-5′-sulphophenylazo)-1-acetylamino-4-naphthol. | 4-(2″-hydroxy-5″-nitrophenylazo)-1-(4′-aminophenyl)-3-methyl-5-pyrazolone. | do | Reddish brown. |
| 75 | 4-(2″-hydroxy-4″-aminophenylazo)-1-(3′-aminophenyl)-3-methyl-5-pyrazolone. | 4-(3″-nitro-2″-hydroxy-5″-sulphophenyl-azo)-1-(3′-aminophenyl)-3-methyl-5-pyrazolone. | do | Dark red brown. |
| 76 | 4-(5″-sulpho-2″-carboxyphenylazo)-1-(3′-aminophenyl)-3-methyl-5-pyrazolone. | 3-(2′-hydroxy-4′-sulphamyl-5′-chloro-phenylazo)-1-acryloylamino-4-naphthol. | do | Dull green. |
| 77 | 2-(2′-carboxyphenylazo)-6-amino-1-naphthol-3-sulphonic acid. | 5-(2′-hydroxy-3′-chloro-5′-sulphamyl-phenylazo)-1-amino-6-naphthol. | β-Chloropropionyl chloride | Dull violet. |
| 78 | 1-(6′-amino-2′-hydroxy-4′-sulpho-naphthylazo)-2-naphthol. | 8-(2′-hydroxy-5′-nitrophenylazo)-1-acryloylamino-7-naphthol. | Acryloyl chloride | Blue grey. |
| 79 | 3-(6′-nitro-2′-hydroxy-4′-sulpho-1′-naphthylazo)-1-amino-4-naphthol. | do | do | Greenish grey. |
| 80 | 1-(2′-hydroxy-4′-sulpho-1′-naphthylazo)-2-naphthol. | 4-(2″-carboxyphenylazo)-1-(4′-amino-phenyl)-3-methyl-5-pyrazolone. | Acryloyl chloride | Bluish green. |
| 81 | 1-(2′-hydroxy-5′-sulphophenylazo)-2-naphthol. | 4-(2″-hydroxy-5″-chlorophenylazo)-1-(4′-aminophenyl)-3-methyl-5-pyrazolone. | do | Bordeaux. |
| 82 | do | 4-(2″-hydroxy-5″-nitrophenylazo)-1-(4′-aminophenyl)-3-methyl-5-pyrazolone. | do | Reddish brown. |
| 83 | do | 4-(2″-carboxy-4″-chlorophenylazo)-1-(3′-aminophenyl)-3-methyl-5-amino-pyrazolone. | do | Reddish orange. |
| 84 | 4-(2′-hydroxy-5′-nitrophenylazo)-1-phenyl-3-methyl-5-pyrazolone. | 6-(2′-hydroxy-5′-nitrophenylazo)-2-amino-5-naphthol-7-sulphonic acid. | do | Reddish brown. |
| 85 | do | 7-(2′-hydroxy-5′-chlorophenylazo)-2-amino-8-naphthol-6-sulphonic acid. | do | Bluish brown. |
| 86 | do | 6-(2′-hydroxy-5′-chlorophenylazo)-2-amino-5-naphthol-7-sulphonic acid. | do | Brown. |
| 87 | 4-(2′hydroxy-5′-chlorophenylazo)-1-phenyl-3-methyl-5-pyrazolone. | 7-(2′-hydroxy-5′-nitrophenylazo)-2-amino-8-naphthol-6-sulphonic acid. | Acryloyl chloride | Reddish brown. |
| 88 | do | 6-(2′-hydroxy-5′-nitrophenylazo)-2-amino-5-naphthol-7-sulphonic acid. | do | Do. |
| 89 | do | 7-(2′-hydroxy-5′-chlorophenylazo)-2-amino-8-naphthol-6-sulphonic acid. | do | Brown violet. |
| 90 | 4-(2′-hydroxy-5′-nitrophenylazo)-1-phenyl-3-methyl-5-pyrazolone. | 8-(2′-hydroxy-3′-nitro-5′-sulphophenylazo)-1-amino-7-naphthol. | do | Yellowish brown. |
| 91 | 4-(2″-hydroxy-3″-nitro-5″-sulphamyl-phenylazo)-1-(3′-aminophenyl)-3-methyl-5-pyrazolone. | 1-[3′-(4″-chloro-3″-sulphophenylazo)-2′-hydroxy-5′-methylphenylazo]-2-naphthol. | do | Brown. |
| 92 | do | 1-(2′-hydroxy-3′-sulpho-5′-nitrophenyl-azo)-2-N-ethylaminonaphthalene. | do | Reddish brown. |
| 93 | 1-(2′-hydroxy-3′-nitro-5′-sulphophen-ylazo)-2-naphthol. | 4-(2″-hydroxy-5″-nitrophenylazo)-1-(4′-aminophenyl)-3-methyl-5-pyrazolone. | do | Do. |
| 94 | 1-(2′-hydroxy-3′-nitro-5′-sulphophenyl-azo)-2-naphthol. | 4-(2″-hydroxy-5″-chlorophenylazo)-1-(4′-aminophenyl)-3-methyl-5-pyrazolone. | Acryloyl chloride | Reddish brown. |
| 95 | 1-(2′-hydroxy-5′-chlorophenylazo)-2-naphthol. | 6-(2′-hydroxy-5′-nitrophenylazo)-2-amino-5-naphthol-7-sulphonic acid. | do | Bluish violet. |
| 96 | do | 7-(2′-hydroxy-5′-chlorophenylazo)-2-amino-8-naphthol-6-sulphonic acid. | do | Blue grey. |
| 97 | 1-(2′-hydroxy-5′-nitrophenylazo)-2-naphthol. | do | do | Blue violet. |
| 98 | do | 7-(2′-hydroxy-5′-nitrophenylazo)-2-amino-8-naphthol-6-sulphonic acid. | do | Grey. |
| 99 | do | 6-(2′-hydroxy-5′-nitrophenylazo)-2-amino-5-naphthol-7-sulphonic acid. | do | Reddish grey. |
| 100 | 1-(2′-hydroxy-4′-sulphamylphenylazo)-2-naphthol. | 7-(2′-hydroxy-5′-nitrophenylazo)-2-amino-8-naphthol-6-sulphonic acid. | do | Blue grey. |
| 101 | 1-(2′-hydroxynaphthylazo)-4-sulpho-2-hydroxynaphthalene. | 1-(2′-hydroxy-3′-amino-5′-nitrophenylazo)-2-naphthol. | do | Grey. |
| 102 | do | 1-(2′-hydroxy-3′:5′-diaminophenylazo)-2-naphthol. | do | Do. |
| 103 | 1-(2′-hydroxynaphthylazo)-2-hydroxy-6-aminonaphthalene-4-sulphonic acid. | 1-(2′-hydroxy-3′-amino-5′-nitrophenylazo)-2-naphthol. | do | Do. |
| 104 | do | 1-(2′-hydroxy-5′-nitrophenylazo)-2-naphthol. | do | Do. |

*Example 105*

A mixture of 2.19 parts (0.004 mol) of the 1:1-chromium complex of 1-(4′-sulphophenyl)-3-methyl-4-(5′-chloro-2′-hydroxyphenylazo)-5-pyrazolone, 1.59 parts (0.004 mol) of 1-(4′-acryloylaminophenyl)-3-methyl-4-(5′-chloro-2′-hydroxyphenylazo)-5-pyrazolone, 40 parts of ethanol and 100 parts of water is stirred and heated to the boil. 3.2 parts of a 10% aqueous solution of sodium carbonate are then added and the mixture is stirred at the boil under a reflux condenser for 1½ hours. The solution is cooled to 20° C., filtered and the filtrate so obtained is poured, with stirring, into 1000 parts of a saturated aqueous solution of sodium chloride. The precipitated dyestuff is then filtered off, the resulting solid is dissolved in 200 parts of water at 85° C., 25 parts

*Example 106*

2.19 parts (0.004 mol) of the 1:1-chromium complex of 1 - phenyl - 3 - methyl - 4 - (2′ - hydroxy - 5′ - chloro-3′-sulphophenylazo)-5-pyrazolone is stirred in 40 parts of ethanol at 20° C. A mixture of 1.63 parts (0.004 mol) of 1 - (4′ - acryloylaminophenyl) - 3 - methyl - 4 - (2′-hydroxy-5′-nitrophenylazo)-5-pyrazolone, 0.312 part of sodium carbonate and 100 parts of water is then added and the resulting mixture is stirred at the boil under a reflux condenser for 1½ hours. The resulting mixture is cooled to 20° C., filtered and the filtrate so obtained is poured, with stirring, into 600 parts of a saturated aqueous solution of sodium chloride. The precipitated dyestuff is filtered off. The resulting solid is dissolved in 200 parts of water at 85° C. and 10 parts of sodium chloride are added to reprecipitate the dyestuff, which is then filtered off and dried.

When applied to wool from a neutral or weakly acid dyebath, the dyestuff yields scarlet shades possessing excellent fastness to light and to wet treatments.

Example 107

A mixture of 2.05 parts (0.004 mol) of the 1:1-chromium complex of 1-phenyl-3-methyl-4-(2'-hydroxy-5'-sulphophenylazo)-5-pyrazolone, 1.63 parts (0.004 mol) of 1 - (4' - acryloylaminophenyl) - 3 - methyl - 4 - (2'-hydroxy-5'-nitrophenylazo)-5-pyrazolone, 0.312 part of sodium carbonate, 40 parts of ethanol and 100 parts of water is stirred at the boil under a reflux condenser for ¾ hour. The resulting solution is then poured into 300 parts of a saturated aqueous solution of sodium chloride and the precipitated dyestuff is filtered off. The resulting solid is dissolved in 300 parts of water at 95° C., 15 parts of sodium chloride are added to reprecipitate the dyestuff, which is then filtered off hot and dried.

When applied to wool from a neutral or weakly acid dyebath, the dyestuff yields orange shades possessing excellent fastness properties to light and to wet treatments.

The following table gives further examples of the chromium-containing dyestuffs of the invention which are obtained by reacting the 1:1-chromium complexes of the azo compounds listed in the second column with the azo compounds listed in the third column by methods similar to those described in Examples 105 to 107. The fourth column of the table gives the shade obtained when the dyestuffs are applied to wool.

of the resulting mixture is finally set at 7 by the addition of sodium carbonate and the mixture is then poured into 1200 parts of a saturated aqueous solution of sodium chloride. The dyestuff which is precipitated is then filtered off, the solid is stirred with 300 parts of water at 75° C., 15 parts of sodium chloride are added and the dyestuff is finally filtered off and dried.

When applied to woolen textile materials from a neutral or sligthly acid dyebath the dyestuff yields greenish-grey shades possessing excellent fastness to light and to wet treatments.

Example 121

A solution of 1.7 parts (0.004 mol) of the monosodium salt of 2-amino-7-(2'-hydroxy-4'-nitrophenylazo)-8-naphthol-6-sulphonic acid and 0.32 part of sodium carbonate in 100 parts of water is added to a solution of 1.73 parts (0.0042 mol) of the 1:1-chromium complex of 1-(2'-hydroxy-5'-nitrophenylazo)-2-naphthol in 40 parts of hot ethanol, and the resulting mixture is stirred for 2½ hours at the boil under a reflux condenser. The mixture is then filtered, 45 parts of β-ethoxyethanol are added to the filtrate, which is then cooled to 2° C. 5 parts of acryloyl chloride are then added during ¾ hour, with stirring, the temperature of the resulting mixture being maintained between 0° and 5° C., and the pH of the mixture being maintained between 6.5 and 7 by the addition of a 10% aqueous solution of sodium carbonate. The resulting mixture is then poured into 1200 parts of a saturated aqueous solution of sodium chloride and the precipitated dyestuff is filtered off. The solid so obtained is stirred in

| Ex. | Azo Compound | Azo Compound | Shade on wool |
|---|---|---|---|
| 108 | 1-phenyl-3-methyl-4-(2'-hydroxy-5'-nitro-3'-sulphophenylazo)-5-pyrazolone. | 1-(4'-acryloylaminophenyl)-3-methyl-4-(2'-hydroxy-5'-chlorophenylazo)-5-pyrazolone. | Scarlet. |
| 109 | ----do---- | 1-(4'-acryloylaminophenyl)-3-methyl-4-(2'-hydroxy-5'-nitrophenylazo)-5-pyrazolone. | Orange. |
| 110 | 1-phenyl-3-methyl-4-(2'-hydroxy-5'-sulphophenyl)-5-pyrazolone. | 1-(4'-acryloylaminophenyl)-3-methyl-4-(2'-hydroxy-5'-chlorophenylazo)-5-pyrazolone. | Scarlet. |
| 111 | 1-phenyl-3-methyl-4-(2'-hydroxy-5'-chloro-3'-sulphophenylazo)-5-pyrazolone. | ----do---- | Yellowish red. |
| 112 | 1-phenyl-3-methyl-4-(2'-hydroxy-3'-nitro-5'-sulphophenylazo)-5-pyrazolone. | ----do---- | Do. |
| 113 | ----do---- | 1-(4'-acryloylaminophenyl)-3-methyl-4-(2'-hydroxy-5'-nitrophenylazo)-5-pyrazolone. | Reddish orange. |
| 114 | ----do---- | 1-(3'-acryloylaminophenyl)-3-methyl-4-(2'-hydroxy-5'-nitrophenylazo)-5-pyrazolone. | Do. |
| 115 | 1-(4'-sulphophenyl)-3-methyl-4-(2'-hydroxy-5'-nitrophenylazo)-5-pyrazolone. | 1-(4'-acryloylaminophenyl)-3-methyl-4-(2'-hydroxy-5'-chlorophenylazo)-5-pyrazolone. | Scarlet. |
| 116 | ----do---- | 1-(4'-acryloylaminophenyl)-3-methyl-4-(2'-hydroxy-5'-nitrophenylazo)-5-pyrazolone. | Orange. |
| 117 | ----do---- | 1-(2'-methyl-5'-acryloylaminophenyl)-3-methyl-4-(2'-hydroxy-5'-nitrophenylazo)-5-pyrazolone. | Do. |
| 118 | 1-(4'-sulphophenyl)-3-methyl-4-(2'-hydroxy-5'-chlorophenylazo)-5-pyrazolone. | ----do---- | Scarlet. |
| 119 | ----do---- | 1-(4'-acryloylaminophenyl)-3-methyl-4-(2'-hydroxy-5'-nitrophenylazo)-5-pyrazolone. | Do. |

Example 120

A solution of 1.7 parts (0.004 mol) of the monosodium salt of 2-amino-6-(2'-hydroxy-4'-nitrophenylazo)-5-naphthol-7-sulphonic acid, and 0.32 part of sodium carbonate in a mixture of 100 parts of water and 45 parts of β-ethoxyethanol is added, during 15 minutes, to a solution of 1.65 parts (0.004 mol) of the 1:1-chromium complex of 1-(5'-nitro-2'-hydroxyphenylazo)-2-naphthol in 70 parts of β-ethoxyethanol at a temperature of 90° to 95° C., and the resulting mixture is then stirred for 1½ hours at 95° to 100° C. The mixture is cooled to 20° C., filtered and the filtrate is then cooled to 2° C. 5 parts of acryloyl chloride are then added, with stirring, during ¾ hour, to the filtrate, the temperature of which is maintained between 0° and 5° C., and the pH of which is maintained at 6.5 to 7 by the simultaneous addition of a 10% aqueous solution of sodium carbonate. The pH 400 parts of water at 70° C., 20 parts of sodium chloride are then added and the precipitated dyestuff is finally filtered off and dried.

When applied to woolen textile materials from a neutral or slightly acid dyebath the dyestuff yields grey shades possessing excellent fastness to light and to wet treatments.

The following table gives further examples of the chromium-containing azo dyestuffs of the invention which are obtained by replacing the 1:1-chromium complexes of the azo compounds used in Examples 120 or 121 by equivalent amounts of the 1:1-chromium complexes of the azo compounds listed in the second column of the table and/or by replacing the azo compounds used in Examples 120 or 121 by equivalent amounts of the azo compounds listed in the third column of the table. The fourth column indicates the shades obtained when the dyestuffs are applied to woolen textile materials.

| E.x | 1:1-chromium complex of the Azo Compound | Azo Compound | Shade |
|---|---|---|---|
| 122 | 1-(3':5'-dinitro-2'-hydroxyphenylazo)-2-naphthol | 2-amino-6-(4'-nitro-2'-hydroxyphenylazo)-5-naphthol-7-sulphonic acid. | Greenish-grey. |
| 123 | 1-(5'-chloro-2'-hydroxyphenylazo)-2-naphthol | ___do___ | Bluish-grey. |
| 124 | ___do___ | 2-amino-6-(4'-chloro-2'-hydroxyphenylazo)-5-naphthol-7-sulphonic acid. | Bluish-violet. |
| 125 | ___do___ | 2-amino-7-(4'-nitro-2'-hydroxyphenylazo)-8-naphthol-6-sulphonic acid. | Blue. |
| 126 | ___do___ | 1-amino-7-(4'-nitro-2'-hydroxyphenylazo)-8-naphthol-4-sulphonic acid. | Reddish-blue. |
| 127 | 1-(5'-nitro-2'-hydroxyphenylazo)-2-naphthol | ___do___ | Bluish-grey. |
| 128 | ___do___ | 2-amino-6-(4'-chloro-2'-hydroxyphenylazo)-5-naphthol-7-sulphonic acid. | Violet. |

Example 129

A mixture of 1.81 parts (0.0044 mol) of the 1:1-chromium complex of 1-(5'-nitro-2'-hydroxyphenylazo)-2-naphthol, 1.7 parts (0.004 mol) of the monosodium salt of 2-amino-6-(4'-nitro-2'-hydroxyphenylazo)-5-naphthol-7-sulphonic acid, 0.32 part of sodium carbonate, 100 parts of water, 40 parts of ethanol and 45 parts of β-ethoxyethanol is stirred for 3 hours at the boil under a reflux condenser. The resulting mixture is then cooled to 20° C. and filtered. The filtrate obtained is then stirred at the boil under a reflux condenser and a solution of 1.6 parts of sodium sulphide nonahydrate (which is the amount required to reduce one of the nitro groups to an amino group) in 10 parts of water is added gradually over 1 hour. The resulting mixture is then stirred at the boil for a further hour. The mixture is then cooled to 20° C., filtered and the filtrate is poured into 900 parts of a saturated aqueous solution of sodium chloride. The mixture is then heated to 80° C. and the precipitated solid is filtered off. The resulting solid is dissolved in a mixture of 100 parts of water and 110 parts of β-ethoxyethanol and 5 parts of acryloyl chloride are then added, with stirring, during ¾ hour, the temperature of the resulting mixture being maintained between 0° and 5° C. by external cooling, and the pH of the mixture being maintained between 6.5 and 7 by the addition of a 10% aqueous solution of sodium carbonate. The resulting mixture is poured into 1500 parts of a saturated aqueous solution of sodium chloride which is then heated to 80° C. and the precipitated dyestuff is filtered off. The solid so obtained is stirred in 200 parts of water at 90° C., 5 parts of sodium chloride are added and the precipitated dyestuff is filtered off and dried.

When applied to woolen textile materials from a neutral or slightly acid dyebath the dyestuff yields reddish-grey shades possessing excellent fastness to light and to wet treatments.

Example 130

In place of the 1.65 parts of the 1:1-chromium complex and the 5 parts of acryloyl chloride used in Example 120 there are used 1.62 parts of the 1:1-chromium complex of 1-(5'-chloro-2'-hydroxyphenylazo)-2-naphthol, and 7 parts of β-chloropropionyl chloride respectively, whereby a dyestuff is obtained which on analysis is found to contain 0.9 atom of hydrolysable chlorine per molecule.

When applied to woolen textile materials from a neutral or slightly acid dyebath the dyestuff yields bluish-grey shades possessing excellent fastness to light and to wet treatments.

Example 131

45.8 parts (0.1 mol) of 6-acrylopylamino-2-(2' hydroxy-4'-nitrophenylazo)-1-naphthol-3-sulphonic acid are added to a mixture of 43.8 parts (0.1 mol) of the 1:1-chromium complex of 1-(2'-hydroxy-5'-chlorophenylazo)-2-naphthol in 450 parts of ethylene glycol at 90° C. The resulting mixture is then stirred for 3 hours at 90° while 40 parts of a 32% aqueous solution of sodium hydroxide are gradually added. The mixture is then cooled to 70° C., then poured, with stirring, into 2000 parts of a 25% aqueous solution of sodium chloride and the precipitated dyestuff is filtered off. The resulting solid is then dissolved in hot water, reprecipitated by the addition of sodium chloride, and the dyestuff is then filtered off and dried. The dyestuff so obtained has the same dyeing and fastness properties as the dyestuff of Example 123.

Example 132

In place of the 45.8 parts of 6-acryloylamino-2-(2'-hydroxy-4'-nitrophenylazo)-1-naphthol-3-sulphonic acid used in Example 131 there are used 45.8 parts of 7-acryloylamino-2-(2'-hydroxy-4'-nitrophenylazo)-1-naphthol-3-sulphonic acid, whereby a dyestuff is obtained which has the same dyeing and fastness properties as the dyestuff of Example 125.

The following table gives further examples of the chromium-containing azo dyestuffs which are obtained by reacting the 1:1-chromium complexes of the azo compounds listed in the second column of the table with the azo compounds listed in the third column of the table by methods similar to those described in Examples 3, 4, 60, 105, 106 and 107. The fourth column of the table indicates the shades obtained when the resulting 1:2-chromium complexes are applied to woolen textile materials.

| Ex. | 1:1-Chromium complex of | Azo Compound | Shade |
|---|---|---|---|
| 133 | 1-(3':5'-dinitro-2'-hydroxyphenylazo)-2-naphthol | 2-acryloylamino-7-(3':5'-dinitro-2'-hydroxyphenylazo)-8-naphthol-6-sulphonic acid. | Black. |
| 134 | ___do___ | 2-acryloylamino-6-(5'-nitro-2'-hydroxyphenylazo)-5-naphthol-7-sulphonic acid. | Do. |
| 135 | ___do___ | 2-acryloylamino-7-(5'-nitro-2'-hydroxyphenylazo)-8-naphthol. | Do. |
| 136 | ___do___ | 2-acryloylamino-6-(3':5'-dinitro-2'-hydroxyphenylazo)-5-naphthol-7-sulphonic acid. | Do. |
| 137 | 1-phenyl-3-methyl-4-(3':5'-dinitro-2'-hydroxyphenylazo)-5-pyrazolone. | 2-acryloylamino-7-(3':5'-dinitro-2'-hydroxyphenylazo)-8-naphthol-6-sulphonic acid. | Brown. |
| 138 | 2-(3'-nitro-5'-sulpho-2'-hydroxyphenylazo)-1-naphthol. | 1-acryloylamino-8-(5'-methylsulphonyl-2'-hydroxyphenylazo)-7-naphthol. | Grey. |
| 139 | ___do___ | 1-acryloylamino-8-(5'-ethylsulphonyl-2'-hydroxyphenylazo)-7-naphthol. | Do. |
| 140 | 1-(2'-hydroxy-4'-sulphonaphth-1'-ylazo)-2-naphthol. | 1-acryloylamino-8-(4'-N-methylsulphamyl-2'-hydroxyphenylazo)-7-naphthol. | Navy blue. |
| 141 | 1-phenyl-3-methyl-4-(5'-sulpho-2'-hydroxyphenylazo)-5-pyrazolone. | β-(4'-sulphonmorpholido-2'-hydroxyphenylazo)acetoacet-4-acryloylaminoanilide. | Orange. |
| 142 | ___do___ | β-(4'-N-methyl-N-β-hydroxyethylsulphamyl-2'-hydroxyphenylazo)acetoacet-4-acryloylamino-anilide. | Do. |
| 143 | 1-(5'-chloro-2'-hydroxyphenylazo)-2-naphthol | 2-acryloylamino-7-(4'-nitro-5'-methyl-2'-hydroxyphenylazo)-8-naphthol-6-sulphonic acid. | Blue. |

| Ex. | 1:1-Chromium complex of | Azo Compound | Shade |
|---|---|---|---|
| 144 | ----do---- | 2-acryloylamino-6-(4'-nitro-5'-methyl-2'-hydroxyphenylazo)-5-naphthol-7-sulphonic acid. | Grey. |
| 145 | ----do---- | 2-acryloylamino-7-(5'-nitro-2'-hydroxyphenylazo)-8-naphthol-6-sulphonic acid. | Blue. |
| 146 | ----do---- | 2-acryloylamino-6-(5'-nitro-2'-hydroxyphenylazo)-8-naphthol-5-sulphonic acid. | Grey. |
| 147 | 1-(5'-nitro-2'-hydroxyphenylazo)-2-naphthol | 2-acryloylamino-7-(3':5'-dinitro-2'-hydroxyphenylazo)-8-naphthol-6-sulphonic acid. | Do. |
| 148 | 1-(5'-methoxy-2'-hydroxyphenylazo)-2-naphthol | 2-acryloylamino-7-(5'-methoxy-2'-hydroxyphenylazo)-8-naphthol-6-sulphonic acid. | Blue. |
| 149 | ----do---- | 2-acryloylamino-7-(5'-chloro-2'-hydroxyphenylazo)-8-naphthol-6-sulphonic acid. | Do. |
| 150 | 1-(5'-chloro-2'-hydroxyphenylazo)-2-naphthol | 2-acryloylamino-7-(5'-methoxy-2'-hydroxyphenylazo)-8-naphthol-6-sulphonic acid. | Do. |
| 151 | 1-(2'-hydroxy-4'-sulphonaphth-1'-ylazo)-2-naphthol | 1-acryloylamino-8-(4'-N:N-diethylsulphamyl-2'-hydroxyphenylazo)-7-naphthol. | Navy blue. |
| 152 | ----do---- | 1-acryloylamino-8-(4'-N-methyl-N-phenylsulphamyl-2'-hydroxyphenylazo)-7-naphthol. | Do. |
| 153 | ----do---- | 1-acryloylamino-8-(4'-N-phenylsulphamyl-2'-hydroxyphenylazo)-7-naphthol. | Do. |
| 154 | 1-(2'-hydroxy-4'-sulphonaphth-1'-ylazo)-6-bromo-2-naphthol. | ----do---- | Do. |
| 155 | 1-(3'-nitrophenyl)-3-methyl-4-(2''-hydroxy-5''-sulphophenylazo)-5-pyrazolone. | 1-acryloylamino-5-(2'-hydroxy-5'-nitrophenylazo)-6-naphthol. | Reddish-brown. |
| 156 | 1-(4'-phenylsulphonylaminophenyl)-3-methyl-4-(2''-hydroxy-5''-sulphophenylazo)-5-pyrazolone. | ----do---- | Brown. |
| 157 | 1-(4'-[4''-methylphenylsulphonylamino]phenyl)-3-methyl-4-(2'''-hydroxy-5'''-sulphophenylazo)-5-pyrazolone. | 1-acryloylamino-5-(2'-hydroxy-5'-nitrophenylazo)-6-naphthol. | Brown. |
| 158 | 1-(4'-propionylaminophenyl)-3-methyl-4-(2''-hydroxy-5''-sulphophenylazo)-5-pyrazolone. | ----do---- | Do. |
| 159 | 1-(4'-benzoylaminophenyl)-3-methyl-4-(2''-hydroxy-5''-sulphophenylazo)-5-prazolone. | ----do---- | Do. |
| 160 | 1-(3'-N-methylsulphamylphenyl)-3-methyl-4-(2''-hydroxy-5''-sulphophenylazo)-5-pyrazolone. | ----do---- | Do. |
| 161 | 1-(3'-N-β-hydroxyethylsulphamylphenyl)-3-methyl-4-(2''-hydroxy-5''-sulphophenylazo)-5-pyrazolone. | ----do---- | Do. |
| 162 | 1-(3'-methylsulphonylphenyl)-3-methyl-4-(2''-hydroxy-5''-sulphophenylazo)-5-pyrazolone. | ----do---- | Do. |
| 163 | 2-(2'-hydroxy-5'-chlorophenylazo)-4-acetyl-1-naphthol | 2-acryloylamino-7-(2'-hydroxy-5'-chlorophenylazo)-8-naphthol-6-sulphonic acid. | Blue. |
| 164 | 1-(2'-hydroxy-4'-nitrophenylazo)-2-naphthol | ----do---- | Navy blue |
| 165 | ----do---- | 2-acryloylamino-6-(2'-hydroxy-5'-chlorophenylazo)-5-naphthol-7-sulphonic acid. | Grey. |

What I claim is:
1. The chromium-containing azo dyestuffs which, in the form of the free acids, are represented by the formula:

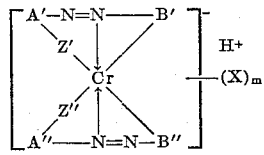

wherein A' and A" each independently represent a radical selected from the class consisting of benzene and naphthalene radicals;

Z' and Z" which are attached to A' and A" respectively in ortho positions to the azo groups are independently selected from the class consisting of —O— and —COO—;

B' and B" each independently represent the radical on a coupling component selected from the class consisting of acetoacetanilide, phenol, naphthol, naphthylamine, 2:4-dihydroxyquinoline, 1-phenyl-5-pyrazolone and 1-naphthyl-5-pyrazolone coupling components which couple in a position adjacent to a metallisable group selected from the class consisting of hydroxy, amino and enolisable keto groups and only one of the benzene and naphthalene rings present in A', A", B' and B' is substituted by a sulphonic in order to more clearly point out that the claimed dyestuff is unsymmetrical.

A", B' and B" are together substituted by a single sulphonic acid group and any further substituents on said rings are selected from the class consisting of chlorine, bromine, nitro, lower alkyl, lower alkoxy, lower alkyl sulphonyl, sulphamyl, sulphonmorpholide, N-lower alkyl sulphamyl, N-hydroxy lower alkyl sulphamyl, N-phenylsulphamyl, N-phenyl-N-lower alkyl sulphamyl, acetyl, acetylamino, propionylamino, benzoylamino, benzene sulphonylamino, toluene sulphonylamino and carbo lower alkoxyamino;

m represents a positive integer not exceeding 2; and
X represents a member selected from the group consisting of acryloylamino and β-chloropropionylamino, 2. A dyestuff as claimed is claim 1 of the formula:

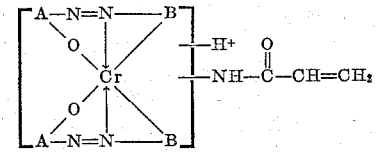

wherein A is a monocyclic carbocylic aryl radical B is a 1-phenyl-5-pyrazolone coupling component, and one on the four radicals represented by A and B contains a sulphonic acid group.

3. A dyestuff as claimed in claim 1 of the formula:

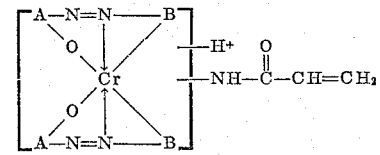

wherein A is a monocyclic carbocylic aryl radical, one B is a naphthol coupling component,
and the other B is naphthol sulphonic acid coupling component.

4. A dyestuff as claimed in claim 1 of the formula:

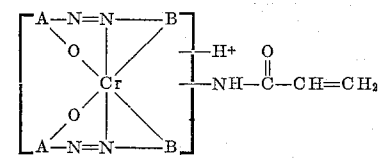

wherein A is a monocyclic carbocylic aryl radical, one B is a 1-phenyl-5-pyrazolone coupling component, and the other B is naphthol sulphonic acid coupling component.

5. The 1:2-chromium complex of equimolecular parts of the dyestuffs having the formula

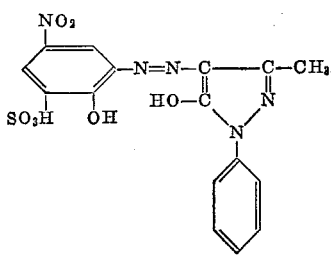

and

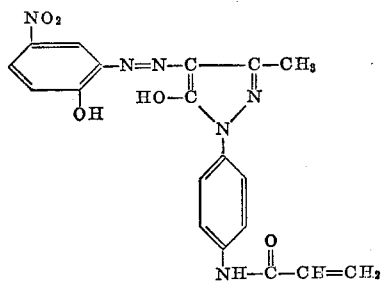

6. The 1:2-chromium complex of equimolecular parts of the dyestuffs having the formula:

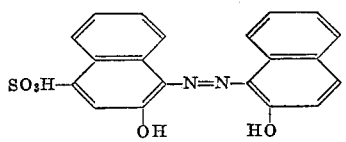

and

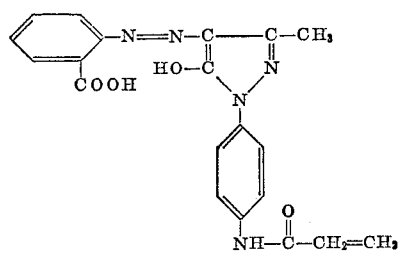

7. The 1:2-chromium complex of equimolecular parts of the dyestuffs having the formula

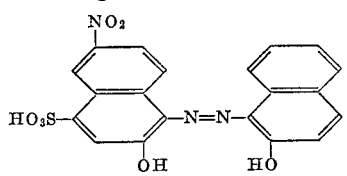

and

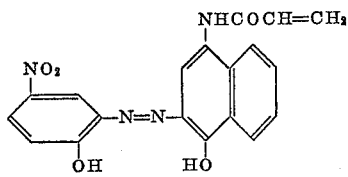

8. The 1:2-chromium complex of equimolecular parts of equimolecular parts of the dyestuffs having the formula

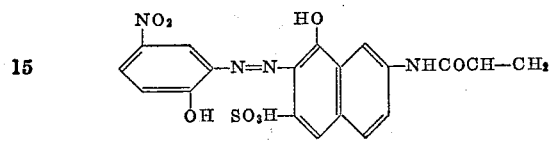

and

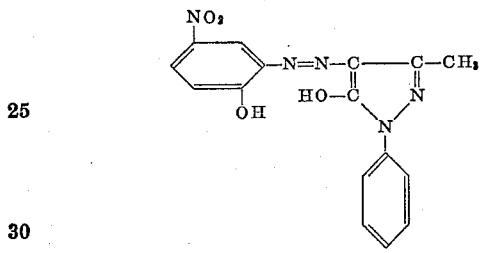

References Cited by the Examiner

UNITED STATES PATENTS

| | | |
|---|---|---|
| 2,806,760 | 9/1957 | Brassel et al. |
| 2,943,084 | 6/1960 | Buehler _____ 260—151 XR |
| 3,009,920 | 11/1961 | Jaeger et al. _____ 260—145 XR |
| 3,057,673 | 10/1962 | Mills _____ 8—54 |
| 3,086,967 | 4/1963 | Daview et al. _____ 260—145 |
| 3,114,745 | 12/1963 | Lodge et al. _____ 260—147 |

FOREIGN PATENTS

| | | |
|---|---|---|
| 565,447 | 9/1958 | Belgium. |
| 1,245,115 | 9/1960 | France. |
| 1,007,451 | 5/1957 | Germany. |

OTHER REFERENCES

Wegmann, J. Textil Praxis, October 1958, pp. 1056–1061.

CHARLES B. PARKER, *Primary Examiner.*

IRVING MARCUS, *Examiner.*

NORMA S. MILESTONE, FLOYD D. HIGEL,
*Assistant Examiners.*